(No Model.) 2 Sheets—Sheet 1.

J. E. PORTER.
HAY CARRIER AND TRACK.

No. 518,895. Patented Apr. 24, 1894.

Witnesses:
Severance
C. Robert Hines

Inventor:
Joseph E. Porter
by his attorneys
Mason, Fenwick & Lawrence (No Model.)　　　　　　　　　　　　　　　　　2 Sheets—Sheet 2.
J. E. PORTER.
HAY CARRIER AND TRACK.
No. 518,895.　　　　　　　　　　　Patented Apr. 24, 1894.
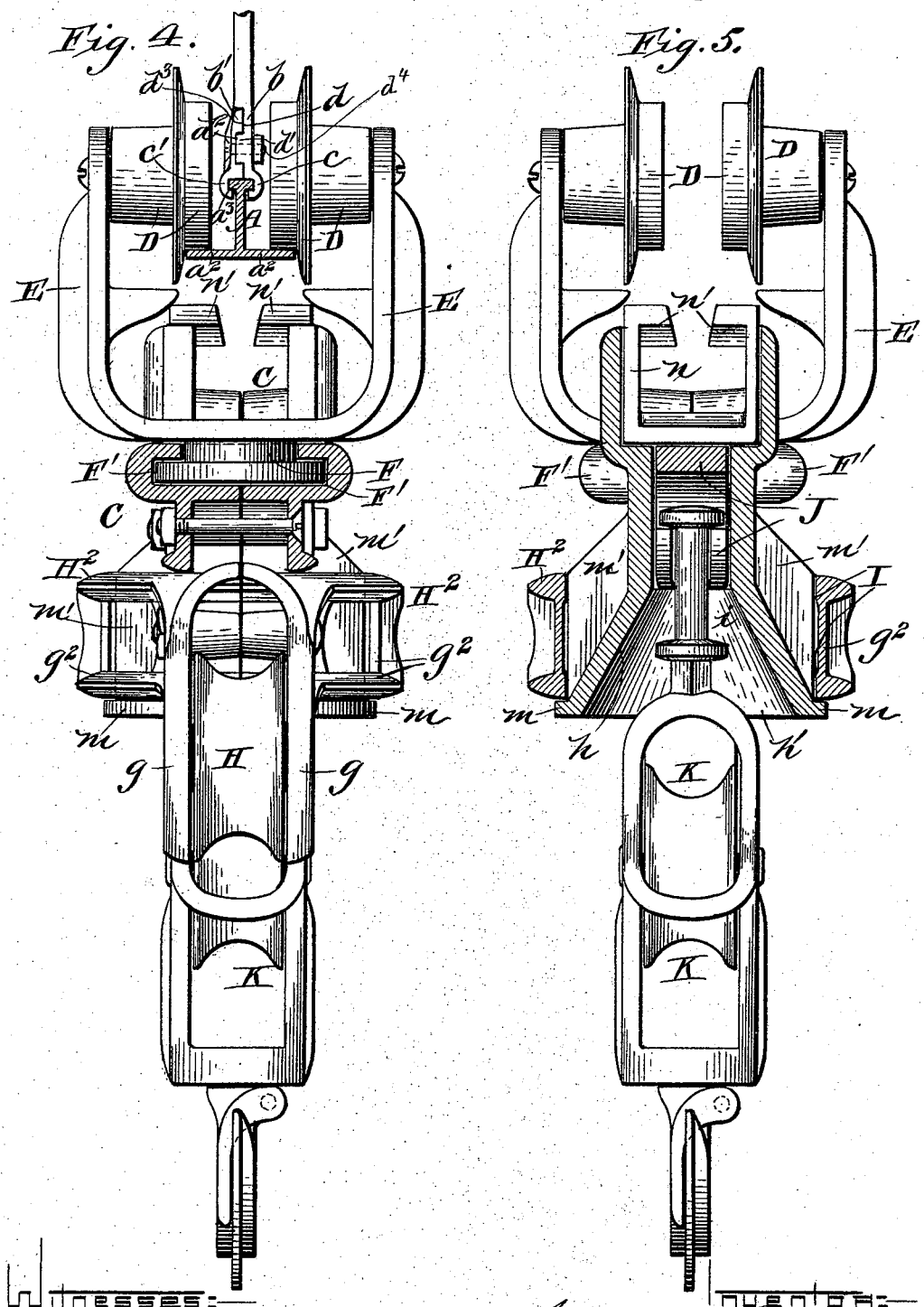

UNITED STATES PATENT OFFICE.

JOSEPH E. PORTER, OF OTTAWA, ILLINOIS.

HAY-CARRIER AND TRACK.

SPECIFICATION forming part of Letters Patent No. 518,895, dated April 24, 1894.

Application filed January 17, 1893. Serial No. 458,680. (No model.)

*To all whom it may concern:*

Be it known that I, JOSEPH E. PORTER, a citizen of the United States, residing at Ottawa, in the county of La Salle and State of Illinois, have invented certain new and useful Improvements in Hay-Carriers and Tracks Therefor; and I do hereby declare the following to be a full, clear, and exact description of the invention, such as will enable others skilled in the art to which it appertains to make and use the same.

My invention relates to hay carrier tracks and carriers which are supported at an elevation from the ground, such tracks having curvatures in them; and its objects are to provide, in such apparatus, in an improved manner, a carrier having horizontal integral bearing or supporting extensions on a plane lower than the tops of the intermediate deep side portions of the carrier, and to arrange on such supports inverted U-shaped bearings, or other equivalent shaped bearings, and to arrange short axles for revolving wheels on the arms of said bearings, and to connect the bearings to the supporting extensions by swivel pins, or other equivalent swiveling means, all in such manner that the carrier readily follows either the straight or the curved parts of the track, as will be hereinafter described and claimed.

By my construction a broad horizontal surface for seating the swiveling bearing is afforded, and great strength, and perfect operation secured.

Another object is to provide suspending hooks for the rail, which are made in two parts, each part having a clasping jaw, and one part formed with a rib and a shoulder and the other part with a groove to receive the rib, and the parts united upon the bead of the rail by a screw passed through them at the point where the rib enters the groove.

My invention will be fully understood from the following specification, claims and accompanying drawings.

Figure 1:
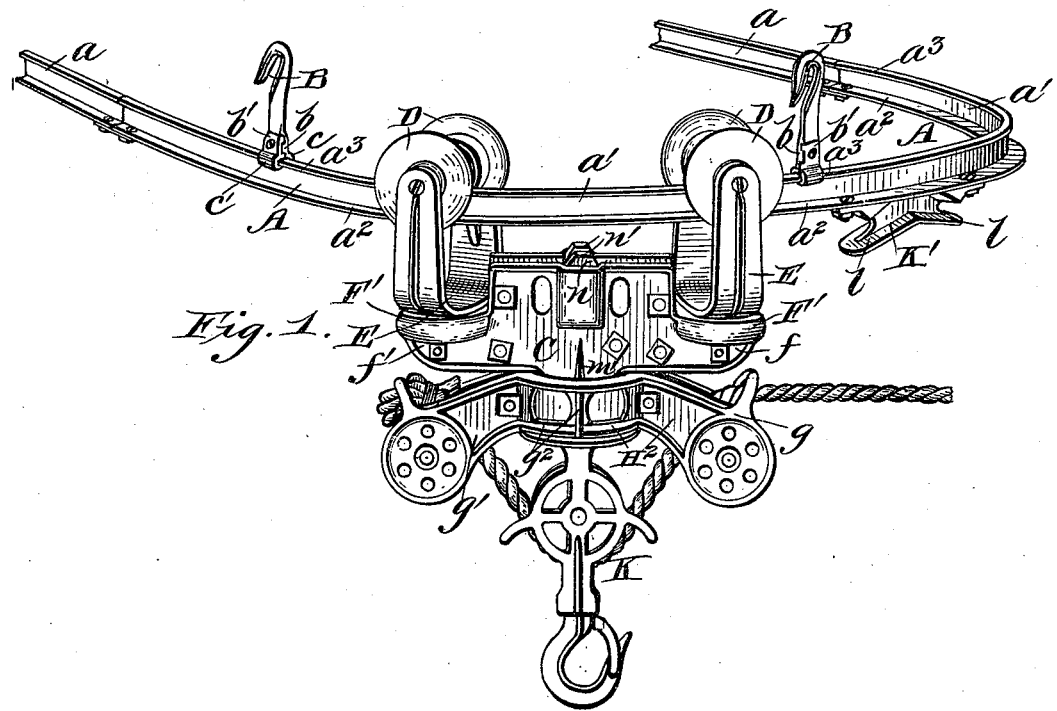
Figure 2:
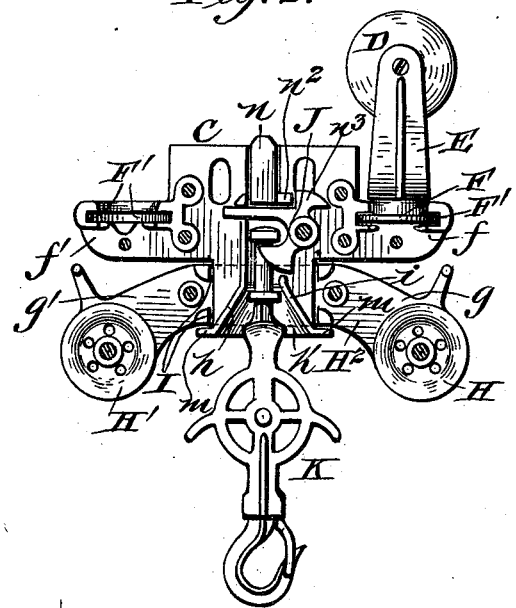
Figure 3:
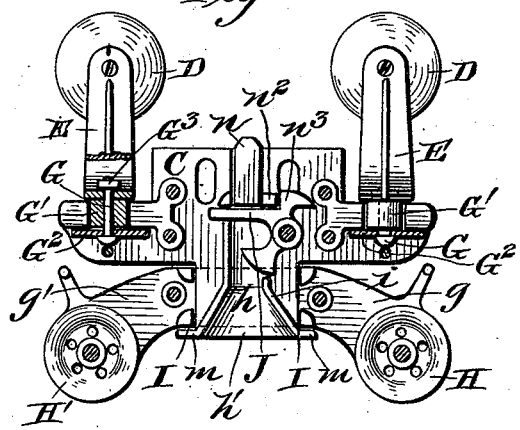

In the acompanying drawings, Figure 1 represents a perspective view of a portion of an elevated suspension hay carrier track formed of curved and straight rails beaded and flanged, and a hay carrier with my invention. Fig. 2 is a central longitudinal section showing the carrier. Fig. 3 is a vertical longitudinal section of the carrier in the line of the caster bearings for the track wheels; in this view the manner of securing the caster bearings to the carrier frame is slightly changed in construction, a central bolt, nut and bottom plate being substituted for the circle plate connecting device shown in the other views. Fig. 4 is a vertical transverse section of the invention on an enlarged scale on the line of the caster bearings for the track wheels, and Fig. 5 is a vertical transverse central section of the carriage.

A in the drawings represents the carrier track constructed with straight and curved beaded flanged rail sections $a\ a'$, and having broad flanges $a^2$ for the wheels to run upon and suspending beads $a^3$ for suspending hooks to clasp upon, properly united together so as to offer no obstruction to the movement of the carrier upon the track. At such points where it is necessary to turn corners to enter buildings or for other purposes, the rails are made as indicated at $a'$ of curved form or in segments of a circle. This track is elevated and supported, preferably, by suspending hooks B adapted to be hooked to irons applied to the rafters of a hay barn, generally under the gable thereof. The track thus suspended has flexibility, and can slightly change its position to accommodate itself to lateral strains that may come upon it by reason of the great weight of the load carried by the carrier. The hooks B at their lower ends are constructed with a clasping head $b\ b'$, said head being made in two parts, each part having a jaw as $c\ c'$, extending under the bead $a^2$ of the rail, and on top of the same. The matching face of the shank of the jaw has formed on it a groove $d$, and a tongue $d'$, and on the matching face of the shank of the jaw $c'$ a groove $d^2$ and a flange $d^3$ are formed. The hooks thus formed are clasped upon opposite sides of the bead of the rail by means of bolts $d^4$ passed through the jaws on the line of the center of the tongues $d'$. By passing the bolts through the tongues a firmer support for them is secured, as the hooks are thickest at this point. The hooks can readily be removed by taking out the bolts and separating the jaws.

C is the hay carrier provided with flanged wheels D, which travel upon the flanges $a^2$ of the track rails, said wheels being mounted on caster bearings E, preferably, of inverted U-form, and connected to forward and rear extensions $f f'$ of the frame of the carrier, by either an inverted swiveling T connection F working in a circular groove F' as indicated in Figs. 1, 2, 4 and 5, or by a swivel screw bolt G, cylindrical washer G', plate $G^2$ and nut $G^3$. By this construction of the bearings for the wheels D, the carriage can easily pass from the straight portions of the track, upon the curved portions, and thus great friction and wear are avoided. The caster bearings for wheels may be constructed separately,—that is, each wheel may have its own swivel bearing, instead of two wheels swiveling on one bearing, as shown. In such modification the lower end of the bearing will be constructed and fitted to extensions of the carriage in substantially the same manner as when two wheels are connected to an inverted U-bearing.

The rope wheels H H' are connected to a swiveling arch-shaped double armed bracket $H^2$, the arms $g$ $g'$ thereof branching backward and forward from a skeleton or open-work ring shaped central portion $g^2$ of the bracket. The frame of the carriage is formed with an inverted cone shaped portion $h$ having an entrance $h'$ substantially the same as in my patent, No. 482,412, dated September 13, 1892, for the same purpose as set forth in said patent. Outside, around the central portion $i$ forming the entrance passage, I now form a cylindrical swivel bearing I by constructing a circular flange $m$ at the bottom of the conical portion $h$ and also a series of vertical radial bearing ribs $m'$ which begin near the base of the frame of the carrier and terminate in the flange as shown. The central ring portion of the bracket is fitted around the bearing I so as to ride upon the flange $m$ and bear against the ribs while swiveling. By this construction the rope pulleys are allowed freedom to swivel in conformity with any curvatures in the track, or as occasion may demand, and thus a very easy movement of the carriage is secured and much friction, wear and bind avoided.

The devices indicated at J for holding and releasing the fall block K, with and from the load, and the knocker block K' for tripping the device which holds the fall block locked, may be substantially the same as in my aforesaid patent, or they may be constructed in the form represented; this form comprising a knocker block with two inclines $l$, in connection with which is used a locking device $n$ having two lugs $n'$ which ride on the inclines, and a stop locking lug $n^2$ which acts as a stop to hold the fall block locked until the lugs $n'$ by riding up one incline move the stop lug $n^2$ up out of the way of the dog $n^3$, and unlock the fall block; and by descending on the other incline allow the locking device $n$ to assume its normal locking position in the carriage frame. This latter releasing device differs somewhat from my aforesaid patented device, and possesses some advantages over the same, on account of its acting by gravity, and the releasing action being positive.

What I claim as my invention is—

1. In combination with a hay carrier track having curvatures in it, a hay carrier C having horizontal integral bearing or supporting extensions $f, f'$ on a plane lower than the upper edges of the deep intermediate side portions of said carrier, bearings fitted by swiveling means to the extensions of the carrier, and in proper relation to the ends of the said side portions of the carrier, short fixed axles attached to the swiveling bearings, and revolving wheels on said axles, substantially as described.

2. In a hay elevator and carrier, a suspending hook formed with clasping jaws made in two parts, which parts are respectively formed with tongue and groove matching faces and united upon the bead of the rail by means of a bolt passed through the thickest or tongue portion of the jaw, substantially as described.

3. In a hay elevator and carrier, the combination of a beaded and flanged rail, a hay carrier track, and the suspending hooks formed with clasping jaws made in two parts which are respectively formed with tongue and groove matching faces and united upon the bead of the rail by means of a bolt passed through the thickest or tongue portion of the jaw, substantially as described.

In testimony whereof I hereunto affix my signature in presence of two witnesses.

JOSEPH E. PORTER.

Witnesses:
I. E. KIRK,
L. O. BROWNE.